(12) United States Patent
Han et al.

(10) Patent No.: US 11,738,929 B2
(45) Date of Patent: Aug. 29, 2023

(54) PACKAGING BOX, METHOD AND DEVICE FOR DETECTING DAMAGE, DETECTION APPARATUS, AND STORAGE MEDIUM

(71) Applicant: BEIJING XIAOMI MOBILE SOFTWARE CO., LTD., Beijing (CN)

(72) Inventors: Jin Han, Beijing (CN); Ximing Zhang, Beijing (CN); Han Wang, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 692 days.

(21) Appl. No.: 16/553,355

(22) Filed: Aug. 28, 2019

(65) Prior Publication Data
US 2020/0172313 A1 Jun. 4, 2020

(30) Foreign Application Priority Data
Nov. 30, 2018 (CN) .......................... 201811457413.7

(51) Int. Cl.
*G01L 1/24* (2006.01)
*B65D 79/02* (2006.01)
*B65D 65/40* (2006.01)

(52) U.S. Cl.
CPC ........... *B65D 79/02* (2013.01); *B65D 65/403* (2013.01); *G01L 1/247* (2013.01)

(58) Field of Classification Search
CPC ......... G01L 1/247; B65D 79/02; B65D 90/48; B65D 65/403
See application file for complete search history.

(56) References Cited

U.S. PATENT DOCUMENTS 5,575,418 A * 11/1996 Wu .......................... B32B 29/08
428/182
5,773,752 A 6/1998 Blume et al.
(Continued)

FOREIGN PATENT DOCUMENTS

CN 1565946 A 1/2005
CN 201165376 Y 12/2008
(Continued)

OTHER PUBLICATIONS

Partial European Search Report dated Mar. 10, 2020 in corresponding European Patent Application No. 19206238.8, 16 pages.
(Continued)

*Primary Examiner* — Natalie Huls
(74) *Attorney, Agent, or Firm* — Oblon, McClelland, Maier & Neustadt, L.L.P.

(57) ABSTRACT

The present disclosure relates to a packaging box, a device and method for detecting damage, a detection apparatus, and a storage medium, and belongs to the field of packaging technologies. The packaging box includes a plurality of packaging cardboards that are combined into the packaging box, wherein at least one packaging cardboard of the plurality of packaging cardboards includes: a surface paper; a backing paper; at least one layer of a core paper; and at least one external force detecting member, wherein the at least one layer of the core paper is disposed between the surface paper and the backing paper, and wherein the at least one external force detecting member is configured to measure a strength value of an external force when the packaging cardboard is subjected to the external force.

20 Claims, 7 Drawing Sheets

(56) References Cited

U.S. PATENT DOCUMENTS

| | | | |
|---|---|---|---|
| 6,742,472 B1* | 6/2004 | Shigyo | G01L 1/247 |
| | | | 116/202 |
| 10,189,626 B2* | 1/2019 | Bahar | G01L 1/247 |
| 10,258,825 B2* | 4/2019 | Meetin | A63B 24/0062 |
| 2014/0127475 A1* | 5/2014 | Bonebrake | B65D 81/1275 |
| | | | 428/186 |
| 2014/0290561 A1* | 10/2014 | Noguchi | B65D 79/02 |
| | | | 116/203 |
| 2014/0318436 A1* | 10/2014 | Schonberg | G01P 15/06 |
| | | | 116/203 |
| 2017/0122855 A1* | 5/2017 | Dantus | A63B 71/08 |
| 2017/0341843 A1* | 11/2017 | Adipietro | B32B 7/12 |
| 2018/0148241 A1* | 5/2018 | Gulas | B32B 27/36 |
| 2019/0250025 A1* | 8/2019 | Dixon, Jr. | B65D 90/48 |

FOREIGN PATENT DOCUMENTS

| | | | |
|---|---|---|---|
| CN | 103112645 A | | 5/2013 |
| CN | 103903181 A | | 7/2014 |
| CN | 104713669 A | | 6/2015 |
| CN | 106586174 A | | 4/2017 |
| CN | 107082175 A | | 8/2017 |
| CN | 108390985 A | | 8/2018 |
| CN | 207843635 U | | 9/2018 |
| CN | 209112594 U | * | 7/2019 |
| CN | 111038824 A | * | 4/2020 |
| CN | 210681571 U | * | 6/2020 |
| JP | 4-251784 A | | 9/1992 |
| JP | 2904444 B2 | | 6/1999 |
| JP | 2021025367 A | * | 2/2021 |
| WO | WO 2016/014355 A1 | | 1/2016 |
| WO | WO-2017191457 A1 | * | 11/2017 |

OTHER PUBLICATIONS

Combined Chinese Office Action and Search Report dated Aug. 28, 2019 in Chinese Patent Application No. 201811457413.7 (with partial unedited computer generated English translation and English translation of categories of cited documents), 38 pages.

* cited by examiner

PACKAGING BOX, METHOD AND DEVICE FOR DETECTING DAMAGE, DETECTION APPARATUS, AND STORAGE MEDIUM

CROSS-REFERENCE TO RELATED APPLICATIONS

This application is based on and claims priority to Chinese Patent Application No. 201811457413.7, filed on Nov. 30, 2018, the entire contents of which are incorporated herein by reference.

TECHNICAL FIELD

The present disclosure relates to the field of packaging technologies, and in particular, to a packaging box, a method and device for detecting damage, a detection apparatus and a storage medium.

BACKGROUND

With the development of logistics networks, logistics has gradually penetrated from first and second-tier cities into third and fourth-tier cities and even villages and towns. However, due to the different traffic and road conditions of different regions and the different management level of logistics workers, there are different degrees of damage to packaging boxes that transfer articles in the logistics transportation process.

Damage detection for a packaging box is often performed by observing the physical condition and extent of damage of the packaging box.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide a packaging box. The packaging box includes a plurality of packaging cardboards that are combined into the packaging box, wherein at least one packaging cardboard of the plurality of packaging cardboards includes: a surface paper; a backing paper; at least one layer of a core paper; and at least one external force detecting member, wherein the at least one layer of the core paper is disposed between the surface paper and the backing paper, and wherein the at least one external force detecting member is configured to measure a strength value of an external force when the packaging cardboard is subjected to the external force.

In an example, the at least one external force detecting member includes at least one pressure sensor that is disposed between the surface paper and the at least one layer of the core paper, and the at least one pressure sensor is configured to measure the strength value of the external force when the packaging cardboard is subjected to the external force.

In another example, the at least one external force detecting member includes at least one liquid layer that is disposed between the surface paper and the backing paper, and the at least one liquid layer is configured to indicate the strength value of the external force through a box color presented on the packaging cardboard by a liquid that flows out from a broken liquid layer when the packaging cardboard is subjected to the external force.

According to an aspect, when the packaging cardboard includes only one layer of the core paper, the at least one liquid layer includes a first liquid layer and a second liquid layer, and the first liquid layer is disposed between the surface paper and the one layer of core paper, and the second liquid layer is disposed between the one layer of core paper and the backing paper, and when the packaging cardboard includes multiple layers of the core paper, the multiple layers of the core paper are sequentially disposed between the surface paper and the backing paper, and the at least one liquid layer is disposed between the multiple layers of the core paper.

According to another aspect, when the packaging cardboard includes only one layer of the core paper, the at least one liquid layer includes one liquid layer, and the liquid layer is disposed between the one layer of the core paper and one of the surface paper and the backing paper, and when the packaging cardboard includes multiple layers of the core paper, the multiple layers of the core paper are sequentially disposed between the surface paper and the backing paper, and the at least one liquid layer is disposed between the multiple layers of core paper.

In an example, each of the at least one liquid layer includes a sealed bag that is composed of a plurality of sealing lattices, wherein each of the plurality of sealing lattices includes liquid, and each of the plurality of sealing lattices is separated from other ones of the plurality of sealing lattices.

In another example, the at least one layer of the core paper includes at least one layer of corrugated core paper, and the at least one layer of the corrugated core paper is one of A corrugated paper, B corrugated paper, C corrugated paper, and E corrugated paper.

In yet another example, an inner side of the backing paper is covered with a protective film for separating the backing paper and articles in the packaging box.

Aspects of the disclosure also provide a method for determining damage of a packaging cardboard. The method includes determining external force information presented by at least one external force detecting member in the packaging cardboard based on an external force when the packaging cardboard is subjected to the external force; and determining a strength value of the external force based on the external force information presented by the at least one external force detecting member.

In an example, the at least one external force detecting member includes at least one pressure sensor, and the external force information is a pressure value of the at least one pressure sensor, and when determining the strength value of the external force, the method further includes determining the strength value of the external force based on the pressure value of the at least one pressure sensor.

In another example, the at least one external force detecting member includes at least one liquid layer, and the external force information is a box color presented on the packaging cardboard by a damaged liquid layer of the at least one liquid layer, and when determining the strength value of the external force, the method further includes determining the strength value of the external force based on the box color.

In yet another example, when determining the strength value of the external force based on the box color, the method includes obtaining, according to the box color, a bearing strength value to which the box color corresponds from a corresponding relationship between the box color and the bearing strength value; and designating the bearing strength value to which the box color corresponds as the strength value of the external force.

In yet another example, after determining the strength value of the external force based on the external force information presented by the at least one external force detecting member, the method further includes generating a detection report according to the strength value of the external force, wherein the detection report includes cardboard identification of the packaging cardboard and the strength value of the external force.

In yet another example, the detection report further includes an amount of compensation, and the method further includes determining, according to the strength value of the external force, the amount of compensation to which the strength value of the external force corresponds from a corresponding relationship between the strength value of the external force and the amount of compensation.

Aspects of the disclosure also provide a detection apparatus including a processor and a memory for storing instructions executable by the processor. The processor is configured to determine external force information presented by at least one external force detecting member in the packaging cardboard based on an external force when the packaging cardboard is subjected to the external force; and determine a strength value of the external force based on the external force information presented by the at least one external force detecting member.

According to an aspect, the processor is further configured to generate a detection report according to the strength value of the external force, wherein the detection report includes cardboard identification of the packaging cardboard and the strength value of the external force.

In an example, the detection report further includes an amount of compensation, and the processor is further configured to determine, based on an article packaged in the packaging box, an article type of the article; and determine the amount of compensation based on the article type, the strength value of the external force, and a corresponding relationship between the strength value of the external force, the article type, and the amount of compensation.

It is to be understood that both the foregoing general description and the following detailed description are illustrative and explanatory only and are not restrictive of the present disclosure.

BRIEF DESCRIPTION OF THE DRAWINGS

The accompanying drawings, which are incorporated in and constitute a part of this specification, illustrate aspects consistent with the disclosure and, together with the description, serve to explain the principles of the disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of illustrative aspects do not represent all implementations consistent with the disclosure. Instead, they are merely examples of apparatuses and methods consistent with aspects related to the disclosure as recited in the appended claims.

The terminology used herein is for the purpose of describing particular aspects only and is not intended to be limiting of example aspects. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Figure 1:
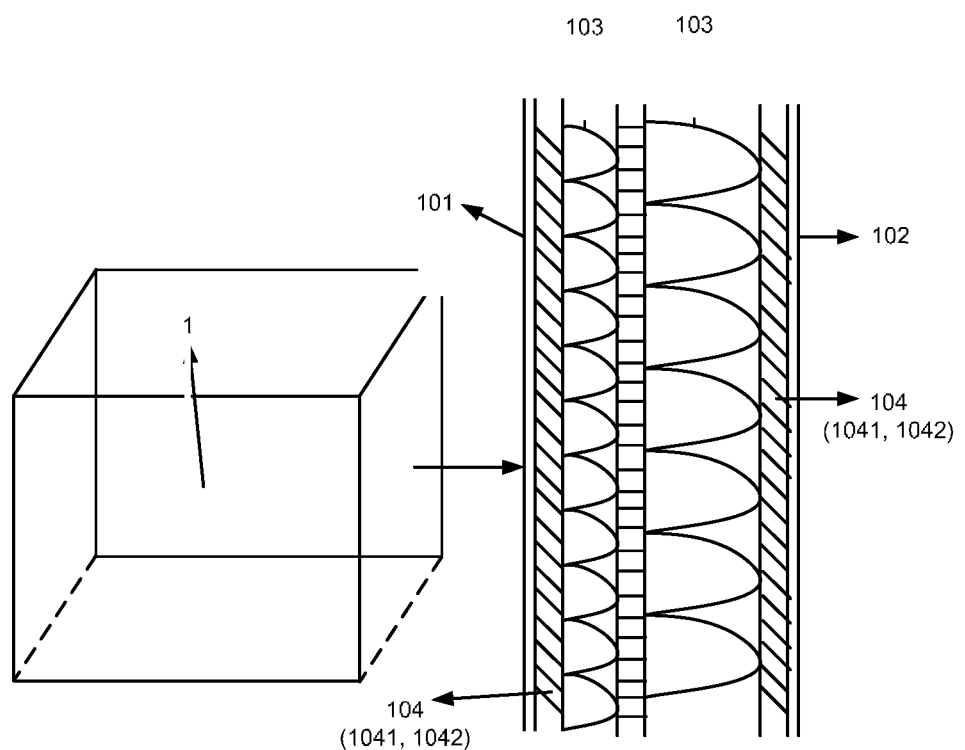
FIG. 1 is a schematic diagram of a packaging cardboard according to an exemplary aspect of the present disclosure.

Aspects of the present disclosure provide a packaging box. Referring to FIG. 1, the packaging box 1 includes a plurality of packaging cardboards 10, and the plurality of packaging cardboards 10 are combined into the packaging box 1. The at least one packaging cardboard 10 includes:

surface paper 101, backing paper 102, at least one layer of core paper 103 and at least one external force detecting member 104;

the at least one layer of core paper 103 is disposed between the surface paper 101 and the backing paper 102; and the at least one external force detecting member 104 is configured to detect the strength of an external force when the packaging cardboard 10 is subjected to the external force.

Wherein, the external force detecting member can be: a component that directly detects and displays the strength value of an external force when an article is subjected to the external force; or a component that can indirectly present the strength value or a relative value of an external force through an external performance of the article under the function of the external force. Wherein, the effect presented by the component or the effect that the component causes the box to present is different when the strength value of the external force received by the article is different. The article here can be a packaging cardboard or an article in the packaging box.

Wherein, the detection result presented by the external force detecting member can be directly viewed by the user, or can be detected by a detection apparatus and be presented to the user by the detection apparatus.

Alternatively, the external force detecting member 104 can be disposed at a position capable of detecting an external force applied to the packaging box or the article in the packaging box. For example, the external force detecting member 104 can be disposed on the backing paper inside the box body. Preferably, at least one layer of core paper 103 and at least one external force detecting member 104 are both disposed between the surface paper 101 and the backing paper 102.

In a possible implementation, at least one external force detecting member 104 can be at least one pressure sensor 1041 or at least one liquid layer 1042.

The external force detecting member 104 can be a pressure sensor 1041 and/or a liquid layer 1042. When at least one external force detecting member 104 is at least one pressure sensor 1041, at least one pressure sensor 1041 is disposed between the surface paper 101 and at least one layer of the core paper 103, and the at least one pressure sensor 1041 is configured to detect the strength of an external force when the packaging cardboard 10 is subjected to the external force.

The number of the pressure sensors 1041 can be set and changed as needed, and is not specifically limited in the aspects of the present disclosure. When the number of the pressure sensor 1041 is one, the sensor 1041 can be disposed between the surface paper 101 and the adjacent core paper 103. When the number of the pressure sensors 1041 is plural, at least one pressure sensor 1041 can be disposed between the surface paper 101 and the adjacent core paper 103; and/or at least one pressure sensor 1041 can be disposed between the core paper 103 and the core paper 103; and/or, at least one pressure sensor 1041 can be disposed between the core paper 103 and the backing paper 102. That is, when the number of the pressure sensors 1041 is plural, the pressure sensors 1041 can be disposed between the surface paper 101 and the adjacent core paper 103, the core paper 103 and the core paper 103, and/or the core paper 103 and the backing paper 102.

When the at least one external force detecting member 104 is at least one liquid layer 1042, the at least one liquid layer 1042 can be disposed between the surface paper 101 and the backing paper 102, and the at least one liquid layer 1042 can be configured to detect the strength of an external force through a box color presented on the packaging cardboard 10 by the liquid flowing out from the broken liquid layer when the packaging cardboard 10 is subjected to the external force.

In the aspects of the present disclosure, at least one external force detecting member 104 is exemplified as at least one liquid layer 1042.

Each liquid layer 1042 in the at least one liquid layer 1042 can be a liquid layer 1042 of a different color, and at least one liquid layer 1042 can be configured to indicate the strength of the external force received by the packaging cardboard 10 through the box color presented on the packaging cardboard 10 by the liquid that flows out from the broken liquid layer.

For each liquid layer 1042, the liquid in one liquid layer 1042 can be a liquid of one color. In the aspects of the present disclosure, the color of the liquid in one liquid layer 1042 is not specifically limited. For example, the liquid in one liquid layer 1042 is a red, yellow or blue liquid.

In a possible implementation, for each liquid layer 1042, the liquid layer 1042 can be a sealed bag; the sealed bag can be a whole sealed bag, and the liquid in the liquid layer 1042 is contained in the whole sealed bag, thus improving the convenience of installing the packaging box 1. The sealed hag can also be composed of a plurality of sealing lattices 107, each sealing lattice 107 contains liquid in the liquid layer 1042, and each sealing lattice 107 can be not connected with each other, so that the position where the packaging cardboard 10 is subjected to an external force can be determined according to the position of the broken sealing lattice 107, thereby improving accuracy.

The number of sealing lattices 107 of each sealed bag can be set and changed as needed, and in the aspects of the present disclosure, the number of sealing lattices 107 of each sealed bag is not specifically limited. For example, each sealed bag consists of 9, 12 or 16 sealing lattices 107. When there are a plurality of liquid layers 1042 in a packaging cardboard 10, there are a plurality of sealed bags, and the number of sealing lattices 107 between adjacent or non-adjacent sealed bags in the plurality of sealed bags can be the same or different. In the aspects of the present disclosure, these are not specifically limited. For example, for two adjacent sealed bags, the number of sealing lattices 107 of one sealed bag can be nine, and the number of sealing lattices 107 of the other sealed hag can be twelve.

Each sealed bag can have a plurality of sealing lattices 107, and each sealing lattice 107 can contain the liquid in the liquid layer 1042. When the sealing lattice 107 is broken, the position of the broken sealing lattice 107 can be judged or determined according to the position of the liquid flowing out from the broken sealing lattice 107. Then, the position where the packaging cardboard 10 is subjected to a force can be judged or determined. For example, the packaging cardboard 10 on the side face has a liquid layer 1042. The sealed bag of the liquid layer 1042 has 16 sealing lattices 107. When it is found in the lower left corner of the packaging cardboard 10 that liquid flows out, it can be judged that the sealing lattices 107 in the lower left corner of the packaging cardboard 10 are broken and the strength of the external force received by the lower left corner of the packaging cardboard 10 is large.

In another possible implementation, the size of the at least one liquid layer 1042 can be the same or different. Moreover, for each liquid layer 1042, the size of the surface paper 101, the backing paper 102, and the core paper 103 are the same. The size of the liquid layer 1042 can be equal to the size of the surface paper 101, the backing paper 102 or the core paper 103; the size of the liquid layer 1042 can also be smaller than the size of the surface paper 101, the backing paper 102 or the core paper 103. When the size of the liquid layer 1042 can be equal to the size of the surface paper 101, the backing paper 102 or the core paper 103, for example, a larger liquid layer 1042 is disposed on the entire packaging cardboard 10, so that the strength of the external force received by the packaging cardboard 10 at any position can be detected. When the size of the liquid layer 1042 is smaller than the size of the surface paper 101, the backing paper 102 or the core paper 103, for example, a small liquid layer 1042 is disposed in a part of the area of the packaging cardboard 10, so that the strength of the external force received by the part of the area of the packaging cardboard 10 can be detected.

When the size of the liquid layer 1042 can be equal to the size of the surface paper 101, the backing paper 102 or the core paper 103, the liquid layer 1042 can be disposed at a central area or an edge area between the surface paper 101 and the backing paper 102. The edge area can be an upper left corner, an upper right corner, a lower left corner, or a lower right corner and so on. In the aspects of the present disclosure, the size and setting area of the liquid layer 1042 are not specifically limited.

The packaging box 1 can include a plurality of packaging cardboards 10, and then all of the plurality of packaging cardboards 10 can be the packaging cardboards 10 with the above structure; or a part of the plurality of packaging cardboards 10 can be the packaging cardboard 10 with the above structure. For example, the packaging box 1 includes six packaging cardboards 10, one of the packaging cardboards is the packaging cardboard 10 with the above structure, or two of the packaging cardboards 10 are the packaging cardboards 10 with the above structure, which is not specifically defined in the aspect of the present disclosure. Moreover, the number of liquid layers 1042 included in the plurality of packaging cardboards 10 can be the same or different.

In a possible implementation, when a part of the plurality of packaging cardboards 10 is the packaging cardboard 10 with the above structure, for any other packaging cardboard 10, the packaging cardboard 10 can include surface paper 101, backing paper 102 and at least one layer of core paper 103; and the at least one layer of core paper 103 can be disposed between the surface paper 101 and the backing paper 102.

A packaging box 1 provided by the aspects of the present disclosure is provided with at least one external force detecting member 104 which is disposed between the surface paper 101 and the backing paper 102, wherein the at least one external force detecting member 104 is configured for detecting the strength of an external force when the packaging cardboard 10 receives the external force. It is possible to judge, no matter the packaging box 1 is damaged or not, the strength of the external force received by the packaging box 1 without opening the box to check, thereby the efficiency and accuracy of the damage detection for the packaging box 1 can be improved. Moreover, the strength of the external force received by the packaging box 1 can be judged, thereby providing a basis for the claim for compensation and improving the rationality of the claim for compensation.

In a possible implementation, at least one packaging cardboard 10 can include at least one layer of core paper 103; and when the packaging cardboard 10 includes a layer of core paper 103, at least one liquid layer 1042 can include a first liquid layer and/or a second liquid layer.

The first liquid layer can be disposed between the surface paper 101 and the core paper 103, and/or the second liquid layer can be disposed between the core paper 103 and the backing paper 102.

When the packaging cardboard 10 includes a layer of core paper 103, the layer of core paper 103 can be a layer of corrugated core paper 103, which can be any of A corrugated paper, B corrugated paper, C corrugated paper and E corrugated paper. Different types of corrugated paper have different corrugating heights and buffering effects. For example, the corrugating heights from low to high are E corrugated paper, B corrugated paper, C corrugated paper and A corrugated paper; and the buffering effects from poor to good are E corrugated paper, B corrugated paper, C corrugated paper and A corrugated paper. For example, the corrugating height of A corrugated paper is the highest, so A corrugated paper has good buffering properties, certain elasticity, and the best buffering effect. The corrugating height of the C corrugated paper is lower than that of the A corrugated paper, but the stiffness and impact resistance of the C corrugated paper is better than that of the A corrugated paper, and the buffering effect is second. Since the buffering effect of A corrugated paper is the best, when the packaging cardboard 10 includes a layer of core paper 103, the layer of core paper 103 can be A corrugated paper.

When the core paper 103 is a layer of corrugated core paper 103, at least one liquid layer 1042 can include a liquid layer 1042, or two liquid layers 1042. When the at least one liquid layer 1042 includes a liquid layer 1042, the one liquid layer 1042 can be disposed between the surface paper 101 and the corrugated core paper 103, or can be disposed between the corrugated core paper 103 and the backing paper 102. In the aspects of the present disclosure, these are not specifically limited. When the at least one liquid layer 1042 includes two liquid layers 1042 which are a first liquid layer and a second liquid layer respectively, the first liquid layer can be disposed between the surface paper 101 and the corrugated core paper 103, and the second liquid layer can be disposed between the corrugated core paper 103 and the backing paper 102.

For example, the packaging cardboard 10 can include a layer of corrugated core paper 103, then a liquid layer 1042 can be disposed between the surface paper 101 and the corrugated core paper 103 as a first liquid layer, and the bearing strength of the first liquid layer can be 5 N; and a liquid layer 1042 can be disposed between the first layer of corrugated core paper 103 and the backing paper 102 as a second liquid layer, and the bearing strength of the second liquid layer can be 10 N. The two kinds of liquid in the first liquid layer and the second liquid layer can be two kinds of liquid with different colors. For example, the liquid in the first liquid layer is a red liquid and the liquid in the second liquid layer is a yellow liquid. When the strength of the external force received by the packaging cardboard 10 is 5 N<F<10 N, the first liquid layer is broken, and the box color presented on the packaging cardboard 10 is red because of the liquid which flows out when the first liquid layer is broken; and when the strength of the external force received by the packaging cardboard 10 is F>10 N, both the first liquid layer and the second liquid layer are broken, and the yellow liquid which flows out when the second liquid layer is broken and the red liquid which flows out when the first liquid layer is broken are mixed, and the presented box color is orange.

In a possible implementation, when the packaging cardboard 10 includes multiple layers of core paper 103, the multiple layers of core paper 103 can be sequentially disposed between the surface paper 101 and the backing paper 102;

at least one liquid layer 1042 can be disposed between the multiple layers of core paper 103, and/or, at least one liquid layer 1042 can be disposed between the surface paper 101 and the adjacent core paper 103, and/or, at least one liquid layer 1042 can be disposed between the backing paper 102 and the adjacent core paper 103.

When the packaging cardboard 10 includes multiple layers of core paper 103, a liquid layer 1042 or a plurality of liquid layers 1042 can be disposed in the packaging cardboard 10. When a liquid layer 1042 is disposed in the packaging cardboard 10, the liquid layer 1042 can be disposed between the surface paper 101 and the adjacent core paper 103, or between the backing paper 102 and the adjacent core paper 103, or between the multiple layers of core paper 103. Wherein, the liquid layer 1042 can be disposed between any adjacent two layers of core paper 103 among the multiple layers of core paper 103.

In the aspects of the present disclosure, when the packaging cardboard 10 includes only one liquid layer 1042, the liquid layer 1042 can be disposed between the multiple layers of core paper 103. The liquid layer 1042 can also be disposed between the surface paper 101 and the adjacent core paper 103. For example, the liquid layer 1042 can be disposed at the outermost side of the packaging cardboard 10, so that the strength of the external force received by the packaging cardboard 10 can be accurately perceived. The liquid layer 1042 can also be disposed between the backing paper 102 and the adjacent core paper 103. For example, the liquid layer 1042 can be disposed on the innermost side of the packaging cardboard 10, thereby the damage degree of the articles in the packaging cardboard 10 can be sensed according to the damage condition of the liquid layer 1042.

When the packaging cardboard 10 includes a plurality of liquid layers 1042, in one possible implementation, a liquid layer 1042 can be disposed between multiple layers of core paper 103, and a liquid layer 1042 can be disposed between the surface paper 101 and the adjacent core paper 103. In another possible implementation, a liquid layer 1042 can be disposed between the multiple layers of core paper 103, and a liquid layer 1042 can be disposed between the backing paper 102 and the adjacent core paper 103. In another possible implementation, a liquid layer 1042 can be disposed between the surface paper 101 and the adjacent core paper 103, and a liquid layer 1042 can be disposed between the backing paper 102 and the adjacent core paper 103. In another possible implementation, a liquid layer 1042 can be disposed between the multiple layers of core paper 103, a liquid layer 1042 can be disposed between the surface paper 101 and the adjacent core paper 103, and a liquid layer 1042 can be disposed between the backing paper 102 and the adjacent core paper 103. In another possible implementation, a plurality of liquid layers 1042 can be disposed between the multiple layers of core paper 103, and a liquid layer 1042 can be disposed between the surface paper 101 and the adjacent core paper 103. In another possible implementation, a plurality of liquid layers 1042 can be disposed between the multiple layers of core paper 103, and a liquid layer 1042 can be disposed between the backing paper 102 and the adjacent core paper 103. In another possible implementation, a plurality of liquid layers 1042 can be disposed between the multiple layers of core paper 103, a liquid layer 1042 can be disposed between the surface paper 101 and the adjacent core paper 103, and a liquid layer 1042 can be disposed between the backing paper 102 and adjacent core paper 103. In the aspects of the present disclosure, these are not specifically limited.

When the packaging cardboard 10 includes a plurality of liquid layers 1042, in one possible implementation, a liquid layer 1042 can be disposed between multiple layers of core paper 103, and a plurality of liquid layers 1042 are disposed between the surface paper 101 and adjacent core paper 103. In another possible implementation, a liquid layer 1042 can be disposed between the multiple layers of core paper 103, and a plurality of liquid layers 1042 can be disposed between the backing paper 102 and the adjacent core paper 103. In another possible implementation, a liquid layer 1042 can be disposed between the surface paper 101 and the adjacent core paper 103, and a plurality of liquid layers 1042 can be disposed between the backing paper 102 and the adjacent core paper 103. In another possible implementation, a plurality of liquid layers 1042 can be disposed between the surface paper 101 and the adjacent core paper 103, and a liquid layer 1042 can be disposed between the backing paper 102 and the adjacent core paper 103. In another possible implementation, a plurality of liquid layers 1042 can be disposed between the plurality of core paper 103, a plurality of liquid layers 1042 can be disposed between the surface paper 101 and the adjacent core paper 103, and a plurality of liquid layers 1042 can be disposed between the backing layer 102 and adjacent core paper 103.

When a plurality of liquid layers 1042 are disposed between the multiple layers of core paper 103, the plurality of liquid layers 1042 can be evenly disposed between the multiple layers of core paper 103, or can be unevenly disposed between the multiple layers of core paper 103. Further, a liquid layer 1042 can be disposed between the adjacent two core paper 103, or a liquid layer 1042 can be disposed at intervals of one or more layers of the core paper 103. For example, the packaging cardboard 10 includes four layers of core paper 103. When a liquid layer 1042 is disposed between the four layers of core paper 103, the liquid layer 1042 can be disposed between the second layer of core paper and the third layer of core paper, or the liquid layer 1042 can be disposed between the first core paper and the second core paper, or the liquid layer 1042 can be disposed between the third core paper and the fourth core paper; when two liquid layers 1042 are disposed between the four layers of core paper 103, a liquid layer 1042 can be disposed between the first core paper and the second core paper, and another liquid layer 1042 can be disposed between the third core paper and the fourth core paper; or a liquid layer 1042 can be disposed between the second layer of core paper and the third layer of core paper, and another liquid layer 1042 can be disposed between the third layer of core paper and the fourth layer of core paper; and when three liquid layers 1042 are disposed between four layers of core paper 103, a liquid layer 1042 can be disposed between adjacent two layers of core paper, for example, a liquid layer 1042 can be disposed between the first layer of core paper and the second layer of core paper, a liquid layer 1042 can be disposed between the second layer of core paper and the third layer of core payer, and a liquid layer 1042 can be disposed between the third layer of core paper and the fourth layer of core paper.

In one possible implementation, the bearing strength of each liquid layer 1042 is different. When a plurality of liquid layers 1042 are included between the surface paper 101 and the backing paper 102, the bearing strength of each of the liquid layers 1042 is gradually increased from the surface paper 101 to the backing paper 102. The bearing strength of each liquid layer 1042 can be set and changed as needed. In the aspects of the present disclosure, the bearing strength of each liquid layer 1042 is not specifically limited.

In a possible implementation, when the packaging cardboard 10 includes multiple layers of core paper 103, the packaging cardboard 10 can include at least one layer of inner paper 105, and a layer of inner paper 105 can be disposed between two adjacent layers of core paper 103. And a liquid layer 1042 can be disposed between the adjacent inner paper 105 and the core paper 103.

When the packaging cardboard 10 includes multiple layers of core paper 103, the number of the multiple layers of core paper 103 can be set and changed as needed. In the aspects of the present disclosure, the number of the multiple layers of core paper 103 is not specifically limited. For example, the packaging cardboard 10 can include 2, 3 or 4 layers of core paper 103. When the packaging cardboard 10 includes multiple layers of core paper 103, the packaging cardboard 10 can further include inner paper 105.

When the packaging cardboard 10 includes multiple layers of core paper 103, the multiple layers of core paper 103 can be a multi-layer corrugated core paper 103 which can be any of A corrugated paper, B corrugated paper, C corrugated paper and E corrugated paper, or a combination of any two or more of them. For example, when the packaging cardboard 10 includes two layers of corrugated core paper 103 which are a first layer of corrugated core paper 103 and a second layer of corrugated core paper 103 respectively. The first layer of corrugated core paper 103 and the second layer of corrugated core paper 103 can be the same type of corrugated paper or different types of corrugated paper. When the first layer of the corrugated core paper 103 and the second layer of the corrugated core paper 103 are the same type of corrugated paper, they can be any of A corrugated paper, B corrugated paper, C corrugated paper or E corrugated paper. When the first layer of corrugated core paper 103 and the second layer of corrugated paper 103 are different types of corrugated paper, the multi-layer corrugated core paper 103 can be set in order of gradually increased corrugating height from the surface paper 101 to the backing paper 102. The corrugating heights of E corrugated paper, B corrugated paper, C corrugated paper, and A corrugated paper are gradually increased, and the multi-layer corrugated core paper 103 can be set in order according to the corrugating heights of E corrugated paper, B corrugated paper, C corrugated paper, and A corrugated paper.

For example, the packaging cardboard 10 includes two layers of corrugated core paper 103 which in sequence, from surface paper 101 to backing paper 102, are a first layer of corrugated core paper 103 and a second layer of corrugated core paper 103 respectively. Then, the first layer of corrugated core paper 103 can be B corrugated paper, and the second layer of core paper 103 can be A corrugated paper; or the first layer of corrugated core paper 103 can be E corrugated paper, and the second layer of corrugated core paper 103 can be C corrugated paper; or the first layer of corrugated core paper 103 can be E corrugated paper, and the second layer of corrugated core paper 103 can be A corrugated paper. When the packaging cardboard 10 includes three layers of corrugated core paper 103, from the surface paper 101 to the backing paper 102, they are sequentially a first layer of corrugated core paper 103, a second layer of corrugated core paper 103 and a third layer of corrugated core paper 103 respectively. The first layer of corrugated core paper 103 can be E corrugated paper, the second layer of corrugated core paper 103 can be B corrugated paper, and the third layer of corrugated core paper 103 can be C corrugated paper; or the first layer of corrugated core paper 103 can be E corrugated paper, the second layer of corrugated core paper 103 can be C corrugated paper, and the third layer of corrugated core paper 103 can be A corrugated paper; or the first layer of corrugated core paper 103 can be B corrugated paper, the second layer of corrugated core paper 103 can be C corrugated paper, and the third layer of corrugated core paper 103 can be A corrugated paper.

Figure 2:
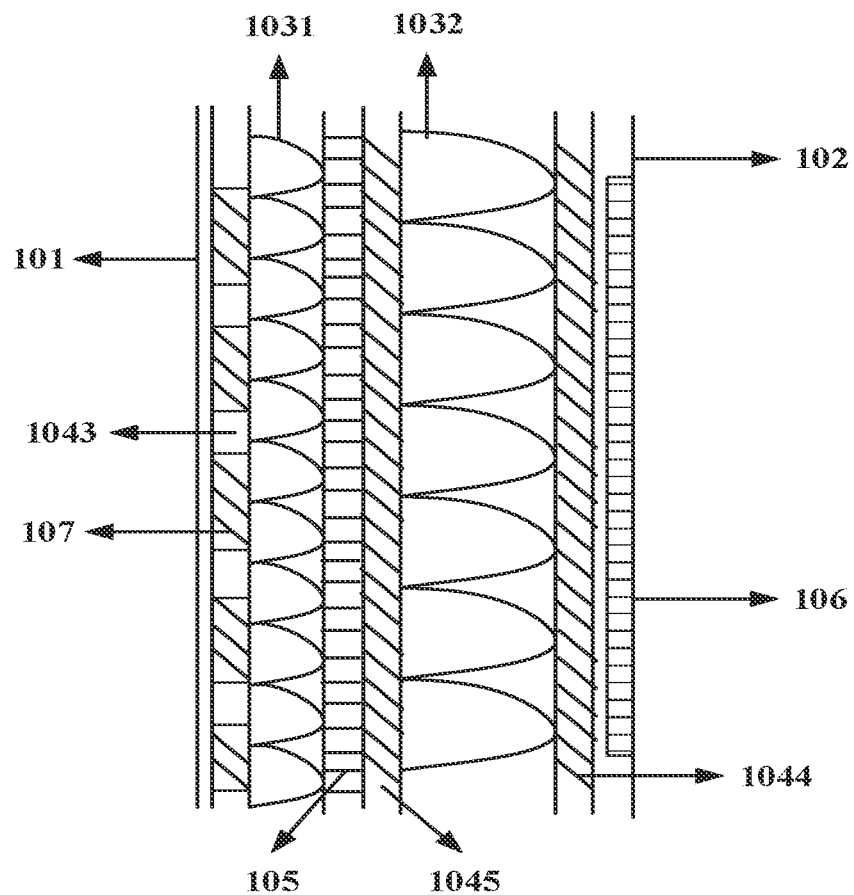
FIG. 2 is a schematic diagram of another packaging cardboard according to an exemplary aspect of the present disclosure.

When the packaging cardboard 10 includes a multi-layer corrugated core paper 103, referring to FIG. 2, for example, the packaging cardboard 10 includes two layers of corrugated core paper 103, and from surface paper 101 to backing paper 102, they are sequentially B corrugated paper 1031 and A corrugated paper 1032 respectively. A layer of inner paper 105 can be disposed between the B corrugated paper 1031 and the A corrugated paper 1032, and a liquid layer can be disposed between the surface paper 101 and the B corrugated paper 1031 as the first liquid layer 1043, and the bearing strength of the first liquid layer 1043 can be 5 N; a liquid layer can be disposed between the B corrugated paper 1031 and the inner paper 105 as the second liquid layer 1044, and the bearing strength of the second liquid layer 1044 can be 10 N; and a liquid layer can be disposed between the A corrugated paper 1032 and the backing paper 102 as the third liquid layer 1045, and the bearing strength of the third liquid layer 1045 can be 20 N. The liquid in the first liquid layer 1043, the second liquid layer 1044, and the third liquid layer 1045 are three kinds of liquid with three different colors. For example, the liquid in the first liquid layer 1043 is red liquid, the liquid in the second liquid layer 1044 is yellow liquid, and the liquid in the third liquid layer 1045 is blue liquid. And when the strength of the external force received by the packaging cardboard 10 is 5 N<F<10 N, the first liquid layer 1043 is broken, and the liquid which flows out from the first liquid layer 1043 when the first liquid layer 1043 is broken is colored red presented on the packaging cardboard 10; when the strength of the external force received by the packaging cardboard 10 is 10 N<F<20 N, both the second liquid layer 1044 and the first liquid layer 1043 are broken, and the yellow liquid flowing out from the broken second liquid layer 1044 and the red liquid flowing out from the broken first liquid layer 1043 are mixed, and the presented box color is orange; and when the strength of the external force F received by the packaging cardboard 10 satisfies F>20 N, the first liquid layer 1043, the second liquid layer 1044 and the third liquid layer 1045 are all broken, and the blue liquid flowing out from the broken third liquid layer 1045, the red liquid flowing out from the broken first liquid layer 1043 and the yellow liquid flowing out from the broken second liquid layer 1044 are mixed, and the presented box color is black.

It should be noted that, when a liquid layer 1042 is disposed between the adjacent inner paper 105 and the corrugated core paper 103, the liquid layer 1042 can be disposed on the left side or the right side of the inner paper 105. For example, a liquid layer 1042 can be disposed between the inner paper 105 and the left adjacent corrugated core paper 103, or a liquid layer 1042 can be disposed between the inner paper 105 and the right adjacent corrugated core paper 103. And two liquid layers 1042 can also be disposed on each of the left and right sides of the inner paper 105 respectively. In the aspects of the present disclosure, these are not specifically limited.

In one possible implementation, the inner side of the backing paper 102 can be covered with a protective film 106 for separating the backing paper 102 and the articles in the packaging box 1.

When the liquid layer 1042 is broken, the liquid flowing out from the liquid layer 1042 may contaminate the articles in the packaging box 1, and therefore, the protective film 106 can be disposed on the inner side of the backing paper 102 for preventing the articles in the packaging box 1 from being contaminated when the liquid layer 1042 is broken. The protective film 106 can be set and changed as needed. In the aspects of the present disclosure, the protective film 106 is not specifically limited. For example, the protective film 106 can be a plastic film.

A packaging box 1 provided by the aspects of the present disclosure is provided with at least one liquid layer 1042 which is disposed between the surface paper 101 and the backing paper 102. When the at least one liquid layer 1042 is broken, the strength of the external force received by the packaging box 1 is judged based on the box color presented on the packaging cardboard 10 by the liquid flowing out from the broken liquid layer 1042. The strength of the external force received by the packaging box 1 can be judged, no matter the packaging box 1 is damaged or not, without opening the box to check, thereby increasing the efficiency and accuracy in detecting the damage of the packaging box 1. Moreover, the strength of the external force received by the packaging box 1 can be judged, thereby providing a basis for the claim for compensation and improving the rationality of the claim for compensation.

Figure 3:
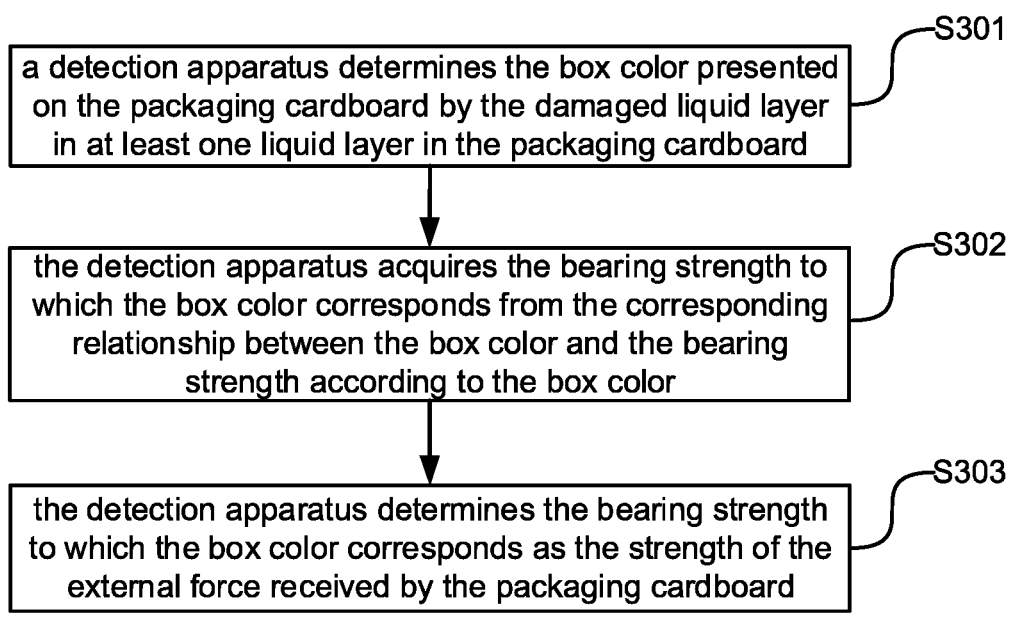
FIG. 3 is a flowchart of a method for detecting damage according to an exemplary aspect of the present disclosure.

The aspects of the present disclosure provide a method for detecting damage, which is applied to the above-mentioned packaging box. Referring to FIG. 3, in the aspects of the present disclosure, at least one external force detecting member is at least one liquid layer, the external force information is the box color presented on the packaging cardboard by the damaged liquid layer, the bearing strength to which the box color corresponds is obtained from the corresponding relationship between the box color and the bearing strength according to the box color, and the strength of the external force received by the packaging cardboard is the bearing strength to which the box color corresponds will be described as examples. The method includes the following steps.

In step S301, a detection apparatus determines the box color presented on the packaging cardboard by the damaged liquid layer in at least one liquid layer in the packaging cardboard.

In the aspects of the present disclosure, when the at least one external force detecting member is at least one liquid layer, the external force information presented by the at least one liquid layer can be a box color presented on the packaging cardboard by the damaged liquid layer in the at least one liquid layer. Correspondingly, the steps for the detection apparatus to determine the box color presented on the packaging cardboard by the damaged liquid layer can include: the detection apparatus detects a packaging box, and determines the box color presented on the packaging cardboard of the packaging box by the damaged liquid layer. Wherein, the detection apparatus can take a picture of the packaging box to obtain a packaging box image, and identify the box color presented on the packaging cardboard from the image of the packaging box.

It should be noted that at least one liquid layer is disposed in the packaging cardboard, and each liquid layer can be a sealed bag composed of a plurality of sealing lattices; or the plurality of packaging cardboards of the packaging box are packaging cardboards with the above structure. Therefore, in this step, a detection apparatus may also detect a plurality of box colors. The plurality of box colors can be the colors presented on one of the packaging cardboards, or can be the colors presented on the plurality of packaging cardboards.

Another point to be noted is that, in this step, a detection apparatus can also detect a force-receiving area where the packaging cardboard is hit. Wherein, the detection apparatus can determine the area that represents the box color as the force-receiving area.

The packaging cardboard is a packaging cardboard that is subjected to an external force in the packaging box. The detection apparatus can determine the packaging cardboard subjected to an external force according to the position of the packaging box during transportation. The packaging boxes may be stacked or placed in a single layer during transportation. When the packaging boxes are stacked, the top packaging cardboard of the packaging boxes in lower layer is subjected to the external force of the packaging boxes in upper layer, and the top packaging cardboard of the packaging box in uppermost layer of packaging box may be free from the external force. When the packaging box is placed in a single layer, all the packaging boxes are placed adjacent to each other. The top packaging cardboard of the packaging box may be free from the external force, and the side packaging cardboard of the packaging box may be subjected to the external force from the side packaging cardboard of one or several adjacent packaging boxes. Therefore, the detection apparatus can determine the packaging cardboard subjected to the external force according to the position of the packaging box.

In step S302, the detection apparatus acquires the bearing strength to which the box color corresponds from the corresponding relationship between the box color and the bearing strength according to the box color.

A corresponding relationship between the box color and the bearing strength can be stored in the detection apparatus; in this step, the detection apparatus directly can obtain the bearing strength to which the box color corresponds from the corresponding relationship between the box color and the bearing strength according to the box color.

Wherein, the detection apparatus can obtain the corresponding relationship between the box color and the bearing strength from other apparatuses, and can also establish the corresponding relationship between the box color and the bearing strength on its own. When the detection apparatus establishes the corresponding relationship between the box color and the bearing strength, the step of the detection apparatus establishing the corresponding relationship between the box color and the bearing strength can be implemented by the following steps (1) to (3).

(1): The detection apparatus determines the color of the liquid in each of the liquid layers in the packaging cardboard and the position of each liquid layer.

(2): The detection apparatus determines, according to the color of the liquid in each liquid layer and the position of each liquid layer, a plurality of box colors that can be presented by the packaging cardboard and a bearing strength to which each box color corresponds.

The detection apparatus superimposes the liquid colors of at least one continuous liquid layer from the outside to the inside according to the color of each liquid layer to obtain a plurality of box colors. For each box color, the detection apparatus takes the sum of the bearing strengths of the at least one liquid layer of the box color obtained through the superimposing as the bearing strength to which the box color corresponds.

For example, the packaging cardboard includes three liquid layers which are a first liquid layer, a second liquid layer and a third liquid layer respectively from the outside to the inside. The liquid in the first liquid layer can be a red liquid, and the bearing strength of the red liquid can be 5 N; the liquid in the second liquid layer can be a yellow liquid, and the bearing strength of the yellow liquid can be 10 N; and the liquid in the third liquid layer can be a blue liquid, and the bearing strength of the blue liquid can be 20 N. The detection apparatus can take red as a box color, and the bearing strength to which the red corresponds can be 5 N. The detection apparatus can take orange obtained by superimposing the red and yellow as a box color, and the bearing strength to which the orange corresponds can be 15 N. The detection apparatus can take black obtained by superimposing red, yellow and blue as a box color, and the bearing strength to which the black corresponds can be 35 N.

(3): The detection apparatus establishes a corresponding relationship between the box color and the bearing strength according to the plurality of box colors and the bearing strength to which the plurality of box colors corresponds.

For example, the packaging cardboard includes two liquid layers which are a red liquid layer and a yellow liquid layer respectively. The maximum external force strength to which the red liquid layer corresponds can be 5 N, and the maximum external force strength to which the yellow liquid layer corresponds can be 10 N. Then, the corresponding relationship between the box color and the strength of the external force established by the detection apparatus can be the corresponding relationship as follows: the box color is red, then the corresponding external force strength is <5 N; and the box color is orange, then the corresponding external force strength is >10 N. When the box color is red, it is directly determined that the strength of the external force received by the packaging cardboard is <5 N. When the box color is orange, it is directly determined that the strength of the external force received by the packaging cardboard is >10 N. For example, the packaging cardboard includes three liquid layers which are a red liquid layer, a yellow liquid layer and a blue liquid layer respectively. The maximum external force strength to which the red liquid layer corresponds can be 5 N, the maximum external force strength to which the yellow liquid layer corresponds can be 10 N, and the maximum external force strength to which the blue liquid layer corresponds can be 20 N. Then, the corresponding relationship between the box color and the strength of the external force established by the detection apparatus can be the corresponding relationship as follows: the box color is red, then the corresponding external force strength is $F<5$ N; the box color is orange, then the corresponding external force strength is $10<F<20$ N; and the box color is black, then the corresponding external force strength $F>20$ N. Then, when the box color is red, it is directly determined that the strength of the external force received by the packaging cardboard is <5 N. When the box color is orange, it is directly determined that the strength of the external force received by the packaging cardboard is $10<F<20$ N. When the box color is black, then it is directly determined that the strength of the external force received by the packaging cardboard is $F>20$ N.

In step S303, the detection apparatus determines the bearing strength to which the box color corresponds as the strength of the external force received by the packaging cardboard.

It should be noted that after the detection apparatus determines the strength of the external force received by the packaging cardboard, the detection apparatus can also determine the strength of the external force received by the packaging box according to the strength of the external force received by the packaging cardboard. Wherein, when a packaging cardboard of the packaging box is subjected to the external force, the detection apparatus can take the strength of the external force received by the packaging cardboard as the strength of the external force received by the packaging box. When a plurality of packaging cardboards of the packaging box are subjected to an external force, the detection apparatus weights the strength of the external force received by the plurality of packaging cardboards to obtain the strength of the external force received by the packaging box.

It should be noted that after the detection apparatus determines the strength of the external force received by the packaging cardboard, a detection report can be generated according to the strength of the external force received by the packaging cardboard, and the detection report can at least include cardboard identification of the packaging cardboard, and the strength of the external force received by the packaging cardboard. The detection report can further include at least one of a force-receiving area where the packaging cardboard is hit, an image of the packaging cardboard, and the strength of the external force received by the packaging box. In addition, after the detection apparatus determines the strength of the external force received by the packaging cardboard, a compensation amount can be determined according to the strength of the external force. Correspondingly, the detection report can also include the compensation amount. Wherein, the cardboard identification can be the position of the packaging cardboard.

In a possible implementation, the corresponding relationship between the strength of the external force and the compensation amount can be stored in the detection apparatus. Correspondingly, the step of determining, by the detection apparatus, the compensation amount according to the strength of the external force can be: the detection apparatus determines, according to the strength of the external force, the compensation amount to which the strength of the external force corresponds from the corresponding relationship between the strength of the external force and the compensation amount.

In the aspects of the present disclosure, after the detection apparatus determines the strength of the external force received by the packaging cardboard, the detection report can be generated according to the strength of the external force. According to the cardboard identification and the strength of the external force received by the packaging cardboard, etc. in the detection report, the damage degree of the article in the packaging box and the compensation amount of the article can be determined, and then compensation can be claimed to the logistics company according to the damage degree and the compensation amount, thereby improving the rationality of the claim for compensation.

In another possible implementation, the corresponding relationship between the strength of the external force, the article type, and the compensation amount is stored in the detection apparatus. Correspondingly, the step of determining, by the detection apparatus, the compensation amount according to the strength of the external force can be: the detection apparatus determines the article type of the article according to the article packaged in the packaging box, and acquires the compensation amount from the corresponding relationship among the strength of the external force, the type of the article, and the compensation amount according to the type of the article and the strength of the external force. Wherein, the article type can be fragile or non-fragile etc.

In the aspects of the present disclosure, the detection apparatus can determine the compensation amount according to the strength of the external force received by the packaging cardboard and the type of the article in the packaging box, thereby providing a sufficient theoretical basis and fact basis for the claim for compensation to the logistics company.

In another possible implementation, the detection apparatus can further determine the strength of the external force received by the packaging cardboard, determine whether the strength of the external force is greater than a preset strength, and generate a detection report and/or determine the compensation amount when the strength of the external force is greater than the preset strength. When the strength of the external force is not greater than the preset strength, no processing is performed.

In the aspects of the present disclosure, a detection apparatus determines whether to generate a detection report and/or determine the compensation amount according to the strength of the external force received by the packaging cardboard and the magnitude of the preset strength, thereby improving the rationality and accuracy of the method for detecting damage.

Wherein, the preset strength can be any strength set in advance; and the preset strength can also be determined according to the packaged articles in the packaging box. The detection apparatus stores the corresponding relationship between the article type and the preset strength in advance; and correspondingly, before determining whether the strength of the external force is greater than the preset strength, the detection apparatus can determine the preset strength to which the article type corresponds from the corresponding relationship between the article type and the preset strength.

In the aspects of the present disclosure, different article types can correspond to different preset strengths. The detection apparatus determines the corresponding preset strength according to the article type, thereby improving the accuracy in detecting the article by the detection apparatus.

A method for detecting damage is provided by the aspects of the present disclosure. A detection apparatus determines the box color presented on the packaging cardboard of the packaging box, acquires the bearing strength to which the box color corresponds from the corresponding relationship between the box color and the bearing strength according to the box color, and takes the bearing strength to which the box color corresponds as the strength of the external force received by the packaging cardboard. The detection apparatus can also generate a detection report based on the determined strength of the external force. The method not only judges the strength of the external force received by the packaging box no matter the packaging box is damaged or not, but also provides a basis for the claim for compensation to the logistics company according to the generated detection report, thereby improving the rationality and accuracy of the claim for compensation.

Figure 4:
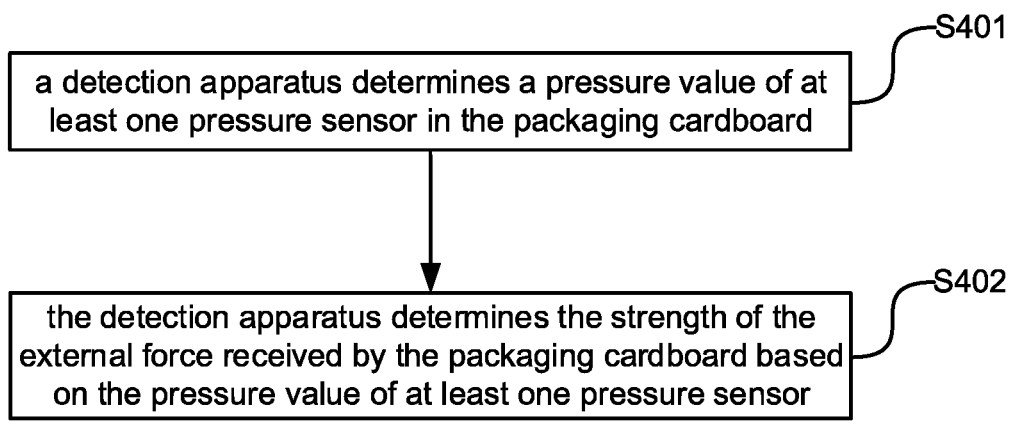
FIG. 4 is a flowchart of a method for detecting damage according to an exemplary aspect of the present disclosure.

The aspects of the present disclosure provide a method for detecting damage, which can be applied in the above-mentioned packaging box. Referring to FIG. 4, in the aspects of the present disclosure, at least one external force detecting member is at least one pressure sensor, and the external force information being the pressure value of the at least one pressure sensor are illustrated as examples. The method includes the following steps.

In step S401, a detection apparatus determines a pressure value of at least one pressure sensor in the packaging cardboard.

At least one pressure sensor is disposed in the packaging cardboard, and the pressure sensor can connect with the detection apparatus by wire or wireless. The pressure sensor can send the detected pressure value to the detection apparatus, and the detection apparatus can read the pressure value sent by the pressure sensor.

The packaging cardboard is a packaging cardboard that receives an external force in the packaging box. In this step, determining the packaging cardboard subjected to the external force in the packaging box is the same as the step of determining the packaging cardboard subjected to the external force in the packaging box in step S301, and details are not described herein again.

In step S402, the detection apparatus determines the strength of the external force received by the packaging cardboard based on the pressure value of at least one pressure sensor.

When the number of the pressure sensors is one, the detection apparatus can directly use the read pressure value of the pressure sensor as the strength of the external force received by the packaging cardboard. When the number of the pressure sensors is plural, the detection apparatus can select the maximum pressure value from the pressure values of the plurality of pressure sensors as the strength of the external force received by the packaging cardboard; or the detection apparatus can take the sum of the pressure values of the plurality of pressure sensors as the strength of the external force received by the packaging cardboard; or the detection apparatus weights and sums the pressure values of the plurality of pressure sensors to acquire the strength of the external force received by the packaging cardboard.

It should be noted that after determining the strength of the external force received by the packaging cardboard, the detection apparatus can also generates a detection report and/or determine a compensation amount. Wherein, the steps of generating the detection report and determining the compensation amount by the detection apparatus are the same as the steps of generating the detection report and determining the compensation amount in step S303, and details are not described herein again.

An aspect of the present disclosure provides a method for detecting damage. A detection apparatus determines a packaging cardboard subjected to an external force in a packaging box, reads a pressure value of the at least one pressure sensor, and determines the strength of the external force received by the packaging cardboard based on the pressure value of the at least one pressure sensor. The method can judge the strength of the external force received by the packaging box without opening the box to check and no matter the packaging box is damaged or not. The method is simple and convenient, and improves the rationality and accuracy of the claim for compensation.

Figure 5:
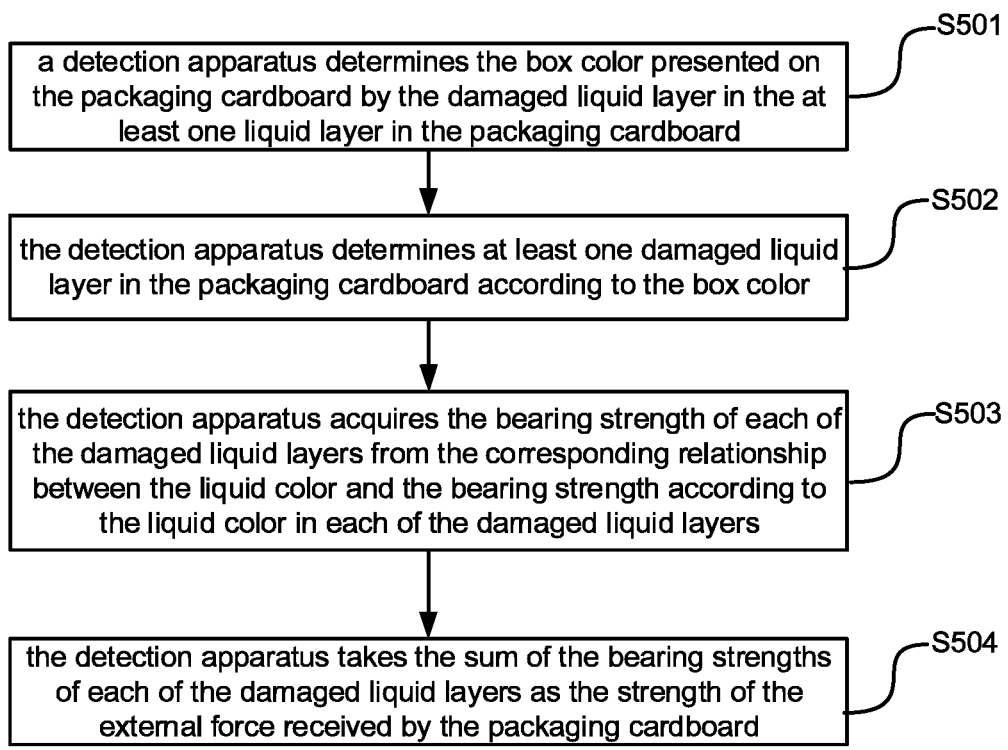
FIG. 5 is a flowchart of a method for detecting damage according to an exemplary aspect of the present disclosure.

The aspect of the present disclosure provides a method for detecting damage, which can be applied to the above-mentioned packaging box. Referring to FIG. 5, in the aspect of the present disclosure, at least one external force detecting member is at least one liquid layer, and the external force information is a box color presented on the packaging cardboard by the damaged liquid layer. And at least one damaged liquid layer is determined according to the box color, and the strength of the external force received by the packaging cardboard is determined according to the at least one damaged liquid layer are illustrated as examples. The method includes the following steps.

In step S501, a detection apparatus determines the box color presented on the packaging cardboard by the damaged liquid layer in the at least one liquid layer in the packaging cardboard.

This step is the same as step S301, and details are not described herein again.

In step S502, the detection apparatus determines at least one damaged liquid layer in the packaging cardboard according to the box color.

A corresponding relationship between the box color and the at least one damaged liquid layer is stored in the detection apparatus. Correspondingly, in this step, the detection apparatus determines at least one damaged liquid layer to which the box color corresponds from the corresponding relationship between the box color and the at least one damaged liquid layer according to the box color of the dyed packaging box.

For example, the packaging cardboard can include two liquid layers which are red liquid layer and yellow liquid layer respectively. When the box color is red, the detection apparatus determines that the red liquid layer in the liquid layers is broken. When the box color is orange, the detection apparatus determines that both the red liquid layer and the yellow liquid layer in the liquid layers are broken. The packaging cardboard can also include three liquid layers which are red liquid layer, yellow liquid layer and blue liquid layer respectively. When the box color is red, the detection apparatus determines that the red liquid layer in the liquid layers is broken. When the box color is orange, the detection apparatus determines that the red liquid layer and the yellow liquid layer in the liquid layers are broken. When the box color is black, the detection apparatus determines that all three liquid layers are broken.

It should be noted that in step S501, when a plurality of box colors are detected out by the detection apparatus, the detection apparatus can determine at least one damaged liquid layer to which each box color corresponds.

In step S503, the detection apparatus acquires the bearing strength of each of the damaged liquid layers from the corresponding relationship between the liquid color and the bearing strength according to the liquid color in each of the damaged liquid layers.

The detection apparatus can store a corresponding relationship between the liquid color and the bearing strength. In this step, for each layer of the damaged liquid layer, the detection apparatus acquires the bearing strength of the damaged liquid layer from the corresponding relationship between the liquid color and the bearing strength according to the liquid color of the damaged liquid layer.

The detection apparatus can acquire the corresponding relationship between the liquid color and the bearing strength from other apparatuses, and can also establish the corresponding relationship between the liquid color and the bearing strength on its own. When the detection apparatus establishes the corresponding relationship between the liquid color and the bearing strength, the step of the detection apparatus establishing the corresponding relationship between the liquid color and the bearing strength can be implemented by the following steps (1) to (3).

(1): The detection apparatus determines the position of each liquid layer in the packaging cardboard.

There can be at least one liquid layer in the packaging cardboard, and the detection apparatus can determine the position of each liquid layer. For example, there are two liquid layers in the packaging cardboard, which are a first liquid layer and a second liquid layer respectively. The detection apparatus can determine that the first liquid layer is located between the surface paper and the corrugated core paper, and the second liquid layer is located between the corrugated core paper and the backing paper. For example, the packaging cardboard has three liquid layers which are a first liquid layer, a second liquid layer and a third liquid layer respectively. The detection apparatus can determine that the first liquid layer is located between the surface paper and the first layer of corrugated core paper, the second liquid layer is located between the first layer of corrugated core paper and the inner paper, and the third liquid layer is located between the second layer of corrugated core paper and the backing paper.

(2): The detection apparatus determines the bearing strength of each liquid layer according to the position of each liquid layer.

Different liquid layers can correspond to different bearing strengths, and the corresponding relationship between the position of the liquid layer and the bearing strength can be stored in the detection apparatus. Therefore, for each liquid layer, the detection apparatus can acquire the bearing strength of the liquid layer from the corresponding relationship between the position of the liquid layer and the bearing strength according to the position of the liquid layer.

For example, the packaging cardboard can include two liquid layers which are a first liquid layer and a second liquid layer respectively. The first liquid layer can correspond to a bearing strength of 5 N, and the second liquid layer can correspond to a bearing strength of 10 N. The packaging cardboard can also include three liquid layers which are a first liquid layer, a second liquid layer and a third liquid layer respectively. The first liquid layer can correspond to a bearing strength of 5 N, the second liquid layer can correspond to a bearing strength of 10 N, and the third liquid layer can correspond to a bearing strength of 20 N.

(3): The detection apparatus establishes a corresponding relationship between the liquid color and the bearing strength according to the liquid color and the bearing strength of each liquid layer.

The detection apparatus establishes a corresponding relationship between the liquid color and the bearing strength of each liquid layer according to the bearing strength of each liquid layer and the liquid color in each liquid layer.

For example, the packaging cardboard can include two liquid layers which are a first liquid layer and a second liquid layer respectively. The first liquid layer can have a bearing strength of 5 N, and the second liquid layer can have a bearing strength of 10 N. The color of the liquid in the first liquid layer can be red, and the color of the liquid in the second liquid layer can be yellow. Then the established corresponding relationship between the liquid color and the bearing strength can be: the red liquid layer has a bearing strength of 5 N, and the yellow liquid layer has a bearing strength of 10 N. When the packaging cardboard includes three liquid layers which are a first liquid layer, a second liquid layer and a third liquid layer respectively. The first liquid layer can have a bearing strength of 5 N, the second liquid layer can have a bearing strength of 10 N, and the third liquid layer can have a bearing strength of 20 N. The color of the liquid in the first liquid layer can be red, the color of the liquid in the second liquid layer can be yellow, and the color of the liquid in the third liquid layer can be blue. Then the established corresponding relationship between the liquid color and the bearing strength can be: the red liquid layer has a bearing strength of 5 N, the yellow liquid layer has a bearing strength of 10 N, and the blue liquid layer has a bearing strength of 20 N.

It should be noted that, in step S301, when a plurality of box colors are detected out by the detection apparatus, the detection apparatus can acquire the bearing strength of each damaged liquid layer to which each box color corresponds.

Step 504: the detection apparatus takes the sum of the bearing strengths of each of the damaged liquid layers as the strength of the external force received by the packaging cardboard.

For each box color, the detection apparatus can take the sum of the bearing strength of each of the damaged liquid layers to which the box color corresponds as the strength of the external force to which the box color corresponds. When a box color is presented on the packaging cardboard, the bearing strength to which the box color corresponds can be taken as the strength of the external force received by the packaging cardboard. When a plurality of box colors are presented on the packaging cardboard, the sum of the bearing strengths to which the plurality of box colors correspond can be taken as the strength of the external force received by the packaging cardboard, or the maximum of the bearing strengths to which the plurality of box colors correspond can be taken as the strength of the external force received by the packaging cardboard, or the bearing strengths to which the plurality of box colors correspond can be weighted to acquire the strength of the external force received by the packaging cardboard.

For example, the packaging cardboard can include two liquid layers which are a first liquid layer and a second liquid layer respectively. The liquid in the first liquid layer can be red liquid and the liquid in the second liquid layer can be yellow liquid. From the corresponding relationship between the liquid color and the bearing strength, it can be determined that the red liquid layer has a bearing strength of 5 N and the yellow liquid layer has a bearing strength of 10 N. The box color of the packaging cardboard is red, indicating that the red liquid layer is broken. At this time, the strength of the external force received by the packaging cardboard is 5 N. The box color of the packaging cardboard is orange, indicating that both the red liquid layer and the yellow liquid layer are broken. At this time, the strength of the external force of the packaging cardboard is the sum of the bearing strengths of the two liquid layers, that is, 15 N. The packaging cardboard can include three liquid layers which are a first liquid layer, a second liquid layer and a third liquid layer respectively. The liquid in the first liquid layer can be red liquid, the liquid in the second liquid layer can be yellow liquid, and the liquid in the third liquid layer can be blue liquid. From the corresponding relationship between the liquid color and the bearing strength, it can be determined that the red liquid layer has a bearing strength of 5 N, the yellow liquid layer has a bearing strength of 10 N, and the blue liquid layer has a bearing strength of 20 N. When the box color of the packaging cardboard is orange, it means that both the red liquid layer and the yellow liquid layer are broken. At this time, the strength of the external force received by the packaging cardboard is the sum of the bearing strengths of the two liquid layers, that is, 15 N. When the box color of the packaging cardboard is black, it means that the three liquid layers are broken. At this time, the strength of the external force received by the packaging cardboard is the sum of the bearing strengths of the three liquid layers, that is, 35 N.

It should be noted that after determining the strength of the external force received by the packaging cardboard, the detection apparatus can also generate a detection report and/or determine a compensation amount. The steps of generating the detection report and determining the compensation amount by the detection apparatus are the same as the steps of generating the detection report and determining the compensation amount in step S303, and details are not described herein again.

An aspect of the present disclosure provides a method for detecting damage. A detection apparatus determines at least one damaged liquid layer in the packaging cardboard according to the determined box color presented on the packaging cardboard. Based on the liquid color in each of the damaged liquid layers, the bearing strength of each of the damaged liquid layers is acquired from the corresponding relationship between the liquid color and the bearing strength. The sum of the bearing strengths of each of the damaged liquid layers is taken as the strength of the external force received by the packaging cardboard. The detection apparatus can also generate a detection report according to the determined strength of the external force. The method not only can judge the strength of the external force received by the packaging box no matter the package is damaged or not, but also can provide a basis for the claim for compensation to the logistics company according to the generated detection report, thereby improving the rationality and accuracy of the claim for compensation.

Figure 6:
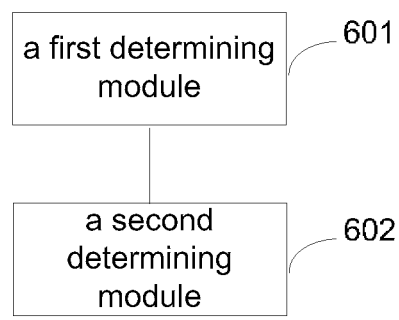
FIG. 6 is a structural schematic diagram of a device for detecting damage according to an exemplary aspect of the present disclosure.

The aspects of the present disclosure provide a device for detecting damage. The device can be applied to a detection apparatus, and can be configured to perform the steps performed by the detection apparatus in the above method for detecting damage. Referring to the FIG. 6, the device includes:

a first determining module 601, configured to determine external force information presented by at least one external force detecting member in the packaging cardboard, wherein the packaging cardboard is a packaging cardboard that is subjected to an external force in the packaging box; and a second determining module 602, configured to determine a strength of the external force to which the packaging cardboard is subjected based on the external force information presented by the at least one external force detecting member.

In a possible implementation, the at least one external force detecting member is at least one pressure sensor, and the external force information is a pressure value of the at least one pressure sensor;

the second determining module 602 is further configured to determine the strength of the external force to which the packaging cardboard is subjected based on the pressure value of the at least one pressure sensor.

In a possible implementation, the at least one external force detecting member is at least one liquid layer, and the external force information is a box color presented on the packaging cardboard by a damaged liquid layer in at least one liquid layer; and the second determining module 602 is further configured to determine the strength of the external force to which the packaging cardboard is subjected based on the box color.

In a possible implementation, the second determining module 602 is further configured to obtain, according to the box color, a bearing strength to which the box color corresponds from a corresponding relationship between the box color and the bearing strength; and take the bearing strength to which the box color corresponds as the strength of the external force to which the packaging cardboard is subjected.

In a possible implementation, the device further includes:

a generating module, configured to generate a detection report according to the strength of the external force to which the packaging cardboard is subjected, wherein the detection report at least comprises cardboard identification of the packaging cardboard and the strength of the external force to which the packaging cardboard is subjected.

In a possible implementation, the detection report further comprises an amount of compensation, and the device further comprises:

a third determining module, configured to determine, according to the strength of the external force, the amount of compensation to which the strength of the external force corresponds from a corresponding relationship between the strength of the external force and the amount of compensation; or the third determining module is configured to determine, according to an article packaged in the packaging box, an article type of the article, and determine the amount of compensation amount, according to the article type and the strength of the external force, from the corresponding relationship between the strength of the external force, the article type, and the amount of compensation.

In a possible implementation, the second determining module 602 is further configured to determine at least one damaged liquid layer in the packaging cardboard based on the box color; determine a bearing strength of each of the damaged liquid layers based on the liquid color of the at least one damaged liquid layer; and take a sum of the bearing strengths of each of the damaged liquid layers as the strength of the external force to which the packaging cardboard is subjected.

In a possible implementation, the second determining module 602 is further configured to acquire the bearing strength of each of the damaged liquid layers from a corresponding relationship between the liquid color and the bearing strength based on the liquid color in each of the damaged liquid layers.

In a possible implementation, the device further includes:

a fourth determining module, configured to determine a position of each liquid layer in the packaging cardboard;

a fifth determining module, configured to determine the bearing strength of each liquid layer based on the position of each liquid layer; and establish the corresponding relationship between the liquid color and the bearing strength based on the liquid color and the bearing strength of each liquid layer.

The aspects of the present disclosure provide a device for detecting damage. A detection apparatus determines the strength of the external force received by the packaging cardboard according to the box color which is obtained by determining the box color presented on the packaging cardboard. The detection apparatus can also generate a detection report according to the determined strength of the external force. The device not only determines the strength of the external force received by the packaging box no matter the packaging box is damaged or not, but also provides a basis for the claim for compensation to the logistics company according to the generated detection report, thereby improving the rationality and accuracy of the claim for compensation.

It should be noted that the device for detecting damage provided in the above aspect is only illustrated by the division of each functional module described above during the damage detection. In actual applications, the functions can be assigned to different functional modules based on needs. That is, the internal structure of the device is divided into different functional modules to perform all or part of the functions described above. In addition, the device for detecting damage provided by the above aspects and the aspects of the method for detecting damage belong to the same concept, and the specific implementation process is described in detail in the method aspect, and details are not described herein again.

Figure 7:
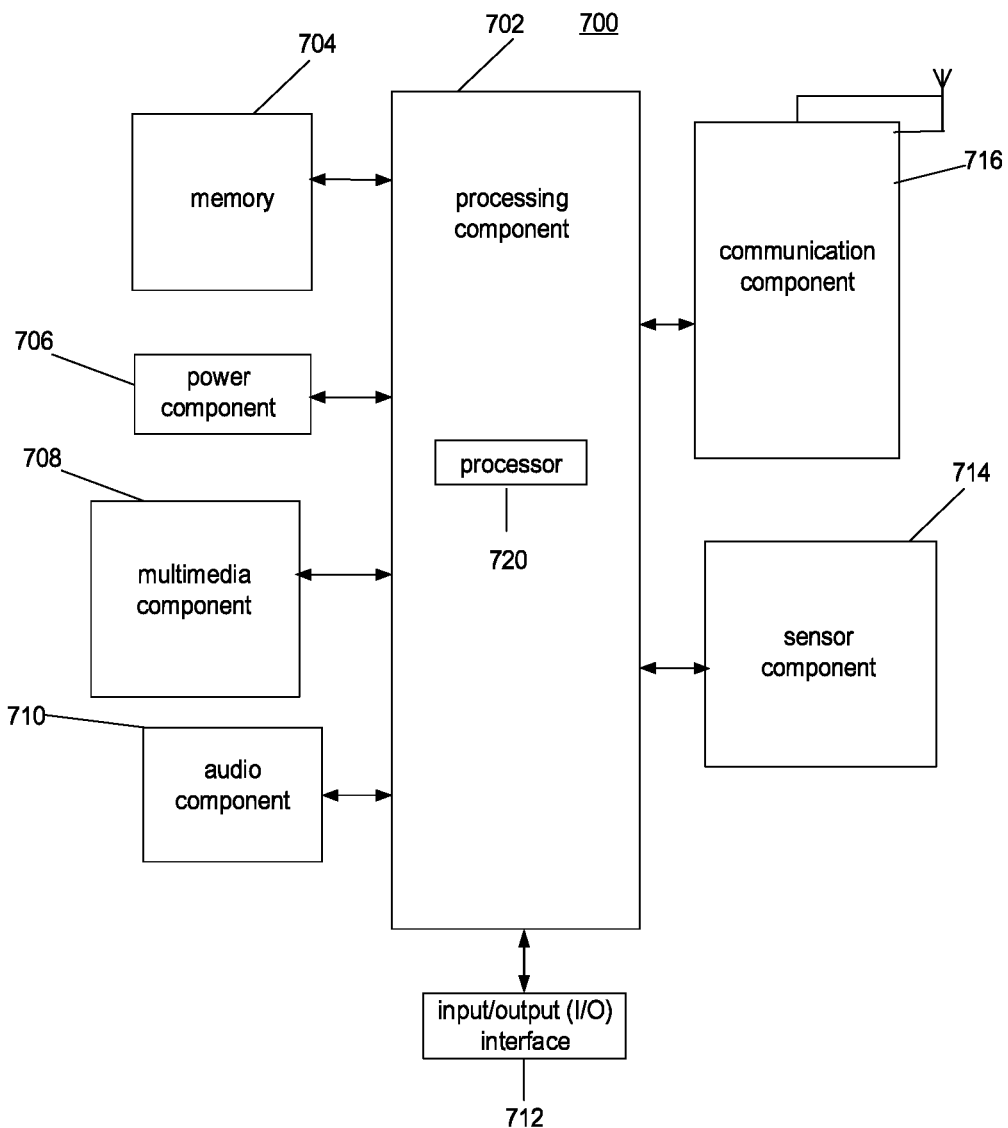
FIG. 7 is a structural block diagram of a detection apparatus according to an exemplary aspect of the present disclosure.

FIG. 7 is a structural block diagram of a detection apparatus 700 provided by the aspects of the present disclosure. For example, the detection apparatus 700 can be configured to perform the method for detecting damage provided by the above each of the aspects. Referring to FIG. 7, the detection apparatus 700 can include one or more of the following components: a processing component 702, a memory 704, a power component 706, a multimedia component 708, an audio component 710, an input/output (I/O) interface 712, a sensor component 714, and a communication component 716.

The processing component 702 typically controls the overall operations of the detection apparatus 700, such as the operations associated with display, telephone calls, data communications, camera operations, and recording operations. The processing component 702 can include one or more processors 720 to execute instructions to perform all or part of the steps in the above described methods. Moreover, the processing component 702 can include one or more modules which facilitate the interaction between the processing component 702 and other components. For instance, the processing component 702 can include a multimedia module to facilitate the interaction between the multimedia component 708 and the processing component 702.

The memory 704 is configured to store various types of data to support the operation of the detection apparatus 700. Examples of such data include instructions for any applications or methods operated on the detection apparatus 700, contact data, phonebook data, messages, pictures, videos, etc. The memory 704 can be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 706 provides power to various components of the detection apparatus 700. The power component 706 can include a power management system, one or more power sources, and any other components associated with the generation, management, and distribution of power in the detection apparatus 700.

The multimedia component 708 includes a screen providing an output interface between the detection apparatus 700 and the user. In some aspects, the screen can include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensors can not only sense a boundary of a touch or swipe action, but also sense the duration and pressure associated with the touch or swipe action. In some aspects, the multimedia component 708 includes a front camera and/or a rear camera. The front camera and the rear camera can receive external multimedia data while the detection apparatus 700 is in an operation mode, such as a photographing mode or a video mode. Each of the front camera and the rear camera can be a fixed optical lens system or have focus and optical zoom capability.

The audio component 710 is configured to output and/or input audio signals. For example, the audio component 710 includes a microphone (MIC) configured to receive external audio signals when the detection apparatus 700 is in an operation mode, such as a call mode, a recording mode, and a voice recognition mode. The received audio signal can be further stored in the memory 704 or transmitted via the communication component 716. In some aspects, the audio component 710 further includes a speaker for outputting audio signals.

The I/O interface 712 provides an interface between the processing component 702 and peripheral interface modules, such as a keyboard, a click wheel, buttons, and the like. The buttons can include, but are not limited to, a home button, a volume button, a start button, and a lock button.

The sensor component 714 includes one or more sensors to provide status assessments of various aspects of the detection apparatus 700. For instance, the sensor component 714 can detect an on/off status of the apparatus 700, relative positioning of components, e.g., the display device and the mini keyboard of the detection apparatus 700, and the sensor component 714 can also detect a position change of the detection apparatus 700 or a component of the detection apparatus 700, presence or absence of user contact with the detection apparatus 700, orientation or acceleration/deceleration of the detection apparatus 700, and temperature change of the detection apparatus 700. The sensor component 714 can include a proximity sensor configured to detect the presence of nearby objects without any physical contact. The sensor component 714 can also include a light sensor, such as a CMOS or CCD image sensor, configured to image applications. In some aspects, the sensor component 714 can also include an accelerometer sensor, a gyroscope sensor, a magnetic sensor, a pressure sensor, or a temperature sensor.

The communication component 716 is configured to facilitate communication, wired or wirelessly, between the detection apparatus 700 and other devices. The detection apparatus 700 can access a wireless network based on a communication standard, such as WiFi, 4G, or 5G, or a combination thereof. In an exemplary aspect, the communication component 716 receives broadcast signals or broadcast associated information from an external broadcast management system via a broadcast channel. In an exemplary aspect, the communication component 716 further includes a near field communication (NFC) module to facilitate short-range communications.

In exemplary aspects, the detection apparatus 700 can be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary aspects, a non-transitory computer-readable storage medium including instructions is also provided, such as the memory 704 including instructions. The instructions can be executed by the processor 720 in the detection apparatus 700 to perform the above-described methods. For example, the non-transitory computer-readable storage medium can be a ROM, a RAM, a CD-ROM, a magnetic tape, a floppy disc, an optical data storage device, and the like.

The ordinary person skilled in the art can understand that all or part of the steps of the above aspects can be completed by hardware. Or a program can execute related hardware to complete the all or part of the steps of the above aspects. And the program can be stored in a computer-readable storage medium. The above mentioned storage medium can be a read only memory, a magnetic disk or an optical disk, etc.

The following series of paragraphs is presented without limitation to describe additional aspects and features of the disclosure.

Aspect A0. A packaging box, comprising: a plurality of packaging cardboards; the plurality of packaging cardboards are combined into the packaging box; and at least one packaging cardboard comprises:

surface paper, backing paper, at least one layer of core paper and at least one external force detecting member;

the at least one layer of core paper is disposed between the surface paper and the backing paper; and the at least one external force detecting member is configured to detect the strength of an external force when the packaging cardboard is subjected to the external force.

Aspect A1. The packaging box according to aspect A0, wherein the at least one external force detecting member is at least one pressure sensor;

the at least one pressure sensor is disposed between the surface paper and the at least one layer of core paper, and the at least one pressure sensor is configured to detect the strength of the external force when the packaging cardboard is subjected to the external force.

Aspect A2. The packaging box according to aspect A0, wherein the at least one external force detecting member is at least one liquid layer;

the at least one liquid layer is disposed between the surface paper and the backing paper, and the at least one liquid layer is configured to identify the strength of the external force through the box color presented on the packaging cardboard by a liquid that flows out from a broken liquid layer when the packaging cardboard is subjected to the external force.

Aspect A3. The packaging box according to aspect A2, wherein when the packaging cardboard comprises a layer of core paper, the at least one liquid layer comprises a first liquid layer and/or a second liquid layer; and the first liquid layer is disposed between the surface paper and the core paper, and/or the second liquid layer is disposed between the core paper and the backing paper.

Aspect A4. The packaging box according to aspect A2, wherein when the packaging cardboard comprises multiple layers of core paper, the multiple layers of core paper are sequentially disposed between the surface paper and the backing paper;

the at least one liquid layer is disposed between the multiple layers of core paper; and/or, the at least one liquid layer is disposed between the surface paper and the adjacent core paper; and/or;

the at least one liquid layer is disposed between the backing paper and the adjacent core paper.

Aspect A5. The packaging box according to aspect A4, wherein a liquid layer is disposed between two adjacent layers of core paper.

Aspect A6. The packaging box according to aspect A4, wherein the packaging cardboard comprises at least one layer of inner paper, and a layer of inner paper is disposed between two adjacent layers of core paper, and a liquid layer is disposed between the adjacent inner paper and core paper.

Aspect A7. The packaging box according to aspect A2, wherein for each liquid layer, the liquid layer is a sealed bag, and the sealed bag is composed of a plurality of sealing lattices, each sealed lattice contains liquid in the liquid layer, and each of the sealing lattices is not connected with each other.

Aspect A8. The packaging box according to aspect A0, wherein the at least one layer of core paper is at least one layer of corrugated core paper, and the at least one layer of corrugated core paper is any one of A corrugated paper, B corrugated paper, C corrugated paper and E corrugated paper or a combination of two or more of A corrugated paper, B corrugated paper, C corrugated paper and E corrugated paper.

Aspect A9. A packaging box according to any one of aspects A0 to A8, wherein an inner side of the backing paper is covered with a protective film for separating the backing paper and the articles in the packaging box.

Aspect A10. A method for detecting damage, comprising:

determining external force information presented by at least one external force detecting member in the packaging cardboard, wherein the packaging cardboard is a packaging cardboard that is subjected to an external force in the packaging box;

determining a strength of the external force to which the packaging cardboard is subjected based on the external force information presented by the at least one external force detecting member.

Aspect A11. The method according to aspect A10, wherein the at least one external force detecting member is at least one pressure sensor, and the external force information is a pressure value of the at least one pressure sensor; and the determining the strength of the external force to which the packaging cardboard is subjected based on the external force information presented by the at least one external force detecting member comprises:

determining the strength of the external force to which the packaging cardboard is subjected based on the pressure value of the at least one pressure sensor.

Aspect A12. The method according to aspect A10, wherein the at least one external force detecting member is at least one liquid layer, and the external force information is a box color presented on the packaging cardboard by a damaged liquid layer in at least one liquid layer; and the determining the strength of the external force to which the packaging cardboard is subjected based on the external force information presented by the at least one external force detecting member comprises:

determining the strength of the external force to which the packaging cardboard is subjected based on the box color.

Aspect A13. The method according to aspect A12, wherein the determining the strength of the external force to which the packaging cardboard is subjected based on the box color comprises:

obtaining, according to the box color, a bearing strength to which the box color corresponds from a corresponding relationship between the box color and the bearing strength; and taking the bearing strength to which the box color corresponds as the strength of the external force to which the packaging cardboard is subjected.

Aspect A14. The method according to aspect A10, wherein after determining the strength of the external force to which the packaging cardboard is subjected based on the external force information presented by the at least one external force detecting member, the method further comprises:

generating a detection report according to the strength of the external force to which the packaging cardboard is subjected, wherein the detection report at least comprises cardboard identification of the packaging cardboard and the strength of the external force to which the packaging cardboard is subjected.

Aspect A15. The method according to aspect A14, wherein the detection report further comprises an amount of compensation, and the method further comprises:

determining, according to the strength of the external force, the amount of compensation to which the strength of the external force corresponds from a corresponding relationship between the strength of the external force and the amount of compensation; or determining, according to an article packaged in the packaging box, an article type of the article, and determining the amount of compensation, according to the article type and the strength of the external force, from the corresponding relationship between the strength of the external force, the article type, and the amount of compensation.

Aspect A16. A device for detecting damage, comprising:

a first determining module, configured to determine external force information presented by at least one external force detecting member in the packaging cardboard, wherein the packaging cardboard is a packaging cardboard that is subjected to an external force in the packaging box; and a second determining module, configured to determine a strength of the external force to which the packaging cardboard is subjected based on the external force information presented by the at least one external force detecting member.

Aspect A17. The device according to aspect A16, wherein the at least one external force detecting member is at least one pressure sensor, and the external force information is a pressure value of the at least one pressure sensor; and the second determining module is further configured to determine the strength of the external force to which the packaging cardboard is subjected based on the pressure value of the at least one pressure sensor.

Aspect A18. The device according to aspect A16, wherein the at least one external force detecting member is at least one liquid layer, and the external force information is a box color presented on the packaging cardboard by a damaged liquid layer in at least one liquid layer; and the second determining module is further configured to determine the strength of the external force to which the packaging cardboard is subjected based on the box color.

Aspect A19. The device according to aspect A18, wherein the second determining module is further configured to obtain, according to the box color, a bearing strength to which the box color corresponds from a corresponding relationship between the box color and the bearing strength; and take the bearing strength to which the box color corresponds as the strength of the external force to which the packaging cardboard is subjected.

Aspect A20. The device according to aspect A16, further comprising:

a generating module, configured to generate a detection report according to the strength of the external force to which the packaging cardboard is subjected, wherein the detection report at least comprises cardboard identification of the packaging cardboard and the strength of the external force to which the packaging cardboard is subjected.

Aspect A21. The device according to aspect A20, wherein the detection report further comprises an amount of compensation, and the device further comprises:

a third determining module, configured to determine, according to the strength of the external force, the amount of compensation to which the strength of the external force corresponds from a corresponding relationship between the strength of the external force and the amount of compensation; or the third determining module is configured to determine, according to an article packaged in the packaging box, an article type of the article, and determine the amount of compensation amount, according to the article type and the strength of the external force, from the corresponding relationship between the strength of the external force, the article type, and the amount of compensation.

Aspect A22. A detection apparatus, comprising:

a processor;

a memory for storing instructions that can be executed by the processor;

wherein the processor is configured to: determine external force information presented by at least one external force detecting member in the packaging paperboard, wherein the packaging paperboard is a packaging paperboard subjected to an external force in the packaging box; and determine the strength of the external force to which the packaging paperboard is subjected based on external force information presented by the at least one external force detecting member.

Aspect A23. A non-transitory computer-readable storage medium including instructions that when executed by a processor of a detection apparatus, cause the detection apparatus to perform the method for detecting damage according to any of the preceding aspects A10-A15.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other aspects of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as illustrative only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A packaging box, comprising:
   a plurality of packaging cardboards that are combined into the packaging box,
   wherein at least one packaging cardboard of the plurality of packaging cardboards comprises:
      a surface paper;
      a backing paper;
      at least one layer of a core paper; and
      at least one external force detecting member,
   wherein the at least one layer of the core paper is disposed between the surface paper and the backing paper,
   the at least one external force detecting member is configured to measure a strength value of an external force when the packaging cardboard is subjected to the external force,
   the at least one external force detecting member comprises a plurality of liquid layers that layered between the surface paper and the backing paper, and
   each liquid layer in the plurality of liquid layers is provided with a liquid of one color different from that of other liquid layers, and has a bearing strength different from that of other liquid layers, and the plurality of liquid layers are arranged in an order of gradually increasing bearing strength from the surface paper to the backing paper; and
   the plurality of liquid layers are configured to indicate the strength value of the external force through a box color presented on the packaging cardboard by a liquid that flows out from a broken liquid layer when the packaging cardboard is subjected to the external force, and to indicate a force-receiving area of the packaging cardboard through an area presenting the box color on the packaging paperboard.

2. The packaging box according to claim 1, wherein, when the packaging cardboard comprises only one layer of the core paper, the plurality of liquid layers comprise a first liquid layer and a second liquid layer, and the first liquid layer is disposed between the surface paper and the one layer of core paper, and the second liquid layer is disposed between the one layer of core paper and the backing paper, and
   wherein, when the packaging cardboard comprises multiple layers of the core paper, the multiple layers of the core paper are sequentially disposed between the surface paper and the backing paper, and the plurality of liquid layers are disposed between the multiple layers of the core paper.

3. The packaging box according to claim 1, wherein, when the packaging cardboard comprises only one layer of the core paper, the plurality of liquid layers comprise one liquid layer, and the liquid layer is disposed between the one layer of the core paper and one of the surface paper and the backing paper, and
   wherein, when the packaging cardboard comprises multiple layers of the core paper, the multiple layers of the core paper are sequentially disposed between the surface paper and the backing paper, and the plurality of liquid layers are disposed between the multiple layers of core paper.

4. The packaging box according to claim 1, wherein each of the plurality of liquid layers comprises a sealed bag that is composed of a plurality of sealing lattices, wherein each of the plurality of sealing lattices includes liquid, and each of the plurality of sealing lattices is separated from other ones of the plurality of sealing lattices.

5. The packaging box according to claim 1, wherein the at least one layer of the core paper comprises at least one layer of corrugated core paper, and the at least one layer of the corrugated core paper is one of A corrugated paper, B corrugated paper, C corrugated paper, and E corrugated paper.

6. A packaging box according to claim 1, wherein an inner side of the backing paper is covered with a protective film for separating the backing paper and articles in the packaging box.

7. The packaging box according to claim 1, wherein the backing paper is closer to an interior of the box than the surface paper;
   the at least one layer of the core paper comprises multiple layers of corrugated core paper, at least two layers of the corrugated core paper in the multiple layers of corrugated core paper are of different types, wherein the type indicates a corrugated height and a buffering effect, and the corrugated height is proportional to the buffering, effect; the multiple layers of corrugated core paper are arranged in an order of gradually increasing the corrugating height from the surface paper to the backing paper; and
   the plurality of liquid layers are layered between e surface paper and an adjacent layer of corrugated core paper, and/or, between any two adjacent layers of corrugated core paper, and/or, between the hacking paper and an adjacent layer of corrugated core paper.

8. A method for determining damage of a packaging cardboard of a packaging box, the method comprising: determining external force information presented by at least one external force detecting member in the packaging cardboard based on an external force when the packaging cardboard is subjected to the external force; and determining a strength value of the external force based on the external force information presented by the at least one external force detecting member, wherein a plurality of packaging cardboards are combined into the packaging box, at least one packaging cardboard of the plurality of packaging cardboards comprises: a surface paper; a backing paper; at least one layer of a core paper; and at least one external force detecting member, the at least one layer of the core paper is disposed between the surface paper and the backing paper, the at least one external force detecting member is configured to measure a strength value of an external force when the packaging cardboard is subjected to the external force, the at least one external force detecting member comprises a plurality of liquid layers that are layered between the surface paper and the backing paper, and each liquid layer in the plurality of liquid layers is provided with a liquid of one color different from that of other liquid layers, and has a bearing strength different from that of other liquid layers, and the plurality of liquid layers are arranged in an order of gradually increasing bearing strength from the surface paper to the backing paper; and the plurality of liquid layers are configured to indicate the strength value of the external force through a box color presented on the packaging cardboard by a liquid that flows out from a broken liquid layer when the packaging cardboard is subjected to the external force, and to indicate a force-receiving area of the packaging cardboard through an area presenting the box color on the packaging paperboard cardboard.

9. The method according to claim 8, wherein the external force information is a box color presented on the packaging cardboard by a damaged liquid layer of the plurality of liquid layers, and wherein determining the strength value of the external force comprises determining the strength value of the external force based on the box color.

10. The method according to claim 9, wherein determining the strength value of the external force based on the box color comprises:

obtaining, according to the box color a bearing strength value to which the box color corresponds from a corresponding relationship between the box color and the bearing strength value; and designating the bearing strength value to which the box color corresponds as the strength value of the external force.

11. The method according to claim 8, wherein after determining the strength value of the external force based on the external force information presented by the at least one external force detecting member, the method further comprises:

generating a detection report according to the strength value of the external force, wherein the detection report comprises cardboard identification of the packaging cardboard and the strength value of the external force.

12. The method according to claim 11, wherein the detection report further comprises an amount of compensation, and the method further comprises:

determining, according to the strength value of the external force, the amount of compensation to which the strength value of the external force corresponds from a corresponding relationship between the strength value of the external force and the amount of compensation.

13. A detection apparatus, comprising: a processor; a memory for storing instructions executable by the processor, wherein the processor is configured to perform a method of determining damage of a packaging cardboard of a packaging box, the method comprising: determining external force information presented by at least one external force detecting member in the packaging cardboard based on an external force when the packaging cardboard is subjected to the external force; and determining a strength value of the external force based on the external force information presented by the at least one external force detecting member, wherein a plurality of the packaging cardboards are combined into the packaging box, at least one packaging cardboard of the plurality of packaging cardboards comprises: a surface paper; a backing paper; at least one layer of a core paper; and at least one external force detecting member, the at least one layer of the core paper is disposed between the surface paper and the backing paper, the at least one external force detecting member is configured to measure a strength value of an external force when the packaging cardboard is subjected to the external force, the at least one external force detecting member comprises a plurality of liquid layers that are layered between the surface paper and the backing paper, and each liquid layer in the plurality of liquid layers is provided with a liquid of one color different from that of other liquid layers, and has a bearing strength different from that of other liquid layers, and the plurality of liquid layers are arranged in an order of gradually increasing bearing strength from the surface paper to the backing paper; and the plurality of liquid layers are configured to indicate the strength value of the external force through a box color presented on the packaging cardboard by a liquid that flows out from a broken liquid layer when the packaging cardboard is subjected to the external force, and to indicate a force-receiving area of the packaging cardboard through an area presenting the box color on the packaging paperboard cardboard.

14. The detection apparatus according to claim 13, wherein the external force information is a box color presented on the packaging cardboard by a damaged liquid layer of the plurality of liquid layers, and wherein the processor is further configured to determine the strength value of the external force based on the box color.

15. The detection apparatus according to claim 14, wherein the processor is further configured to:

obtain, according to the box color, a bearing strength value to which the box color corresponds from a corresponding relationship between the box color and the bearing strength value; and designate the bearing strength value to which the box color corresponds as the strength value of the external force.

16. The detection apparatus according to claim 13, the processor is further configured to:

generate a detection report according to the strength value of the external force, wherein the detection report comprises cardboard identification of the packaging cardboard and the strength value of the external force.

17. The detection apparatus according to claim 16, wherein the detection report further comprises an amount of compensation, and wherein the processor is further configured to:

determine, based on an article packaged in the packaging box, an article type of the article; and determine the amount of compensation based on the article type, the strength value of the external force, and a corresponding relationship between the strength value of the external force, the article type, and the amount of compensation.

18. The packaging box according to claim 1, wherein the at least one external force detesting member further comprises at least one pressure sensor that is disposed between the surface paper and the at least one layer of the core paper, and wherein the at least one pressure sensor is configured to measure the strength value of the external force when the packaging cardboard is subjected to the external force.

19. The method according to claim 9, wherein the at least one external force detecting member further comprises at least one pressure sensor, and the external force information is a pressure value of the at least one pressure sensor, and wherein determining the strength value of the external force comprises determining the strength value of the external force based on the pressure value of the at least one pressure sensor.

20. The detection apparatus according to claim 14, wherein the at least one external force detecting member further comprises at least one pressure sensor, and the external force information is a pressure value of the at least one pressure sensor, and wherein the processor is further configured to determine the strength value of the external force based on the pressure value of the at least one pressure sensor.

\* \* \* \* \*